United States Patent [19]
Baxter

[11] Patent Number: 5,107,785
[45] Date of Patent: Apr. 28, 1992

[54] FLOATING DOCK AND BREAKWATER

[76] Inventor: Hal T. Baxter, 1624 5th Street Dr. N.W., Hickory, N.C. 28601

[21] Appl. No.: 624,033

[22] Filed: Dec. 7, 1990

[51] Int. Cl.$^5$ .................................................. B63B 35/38
[52] U.S. Cl. ..................................... 114/266; 114/65 A
[58] Field of Search ................. 114/65 A, 266, 267; 405/219; 14/27; 264/228, 256, 333; 106/99; 52/309.17

[56] References Cited

U.S. PATENT DOCUMENTS

| | | | |
|---|---|---|---|
| Re. 31,984 | 9/1985 | Sluys | 114/267 |
| 3,091,203 | 5/1963 | Usab | 114/266 |
| 3,546,773 | 12/1970 | Gerstin | 114/266 |
| 3,799,093 | 3/1974 | Thomson | 114/266 |
| 4,265,193 | 5/1981 | Sluys | 114/267 |
| 4,318,361 | 3/1982 | Sluys | 114/267 |
| 4,321,882 | 3/1982 | Sluys | 114/267 |
| 4,406,564 | 9/1983 | Hanson | 114/267 |
| 4,487,151 | 12/1984 | Deiana | 114/266 |
| 4,693,631 | 9/1987 | McKay | 405/26 |
| 4,709,647 | 12/1987 | Rytand | 114/267 |
| 4,715,307 | 12/1987 | Thompson | 114/267 |
| 4,938,629 | 7/1990 | Boudrias | 405/219 |

Primary Examiner—Jesûs D. Sotelo
Attorney, Agent, or Firm—Bell, Seltzer, Park and Gibson

[57] ABSTRACT

A concrete floatation module adapted for use as a floating dock, breakwater, and the like. The module includes thickened portions of concrete extending lengthwise in a concrete shell preferably in the corner portions of the shell. The shell surrounds a buoyant foam core which may be used as a molding core for the floatation module. The thickened lengthwise extending portions of concrete include integrally molded tubular liners for creating passageways through the module for the passage therethrough of an interconnecting means, such as a steel cable. The tensioned steel cables maintain the modules in compression in an end-to-end relation thereby forming a single monolithic structure. Widthwise extending liners may also be provided to facilitate the interconnecting of laterally extending branches of modules. The floatation modules may be readily formed on-site by integrally molding the buoyant foam core and tubular liners in the concrete shell.

12 Claims, 5 Drawing Sheets

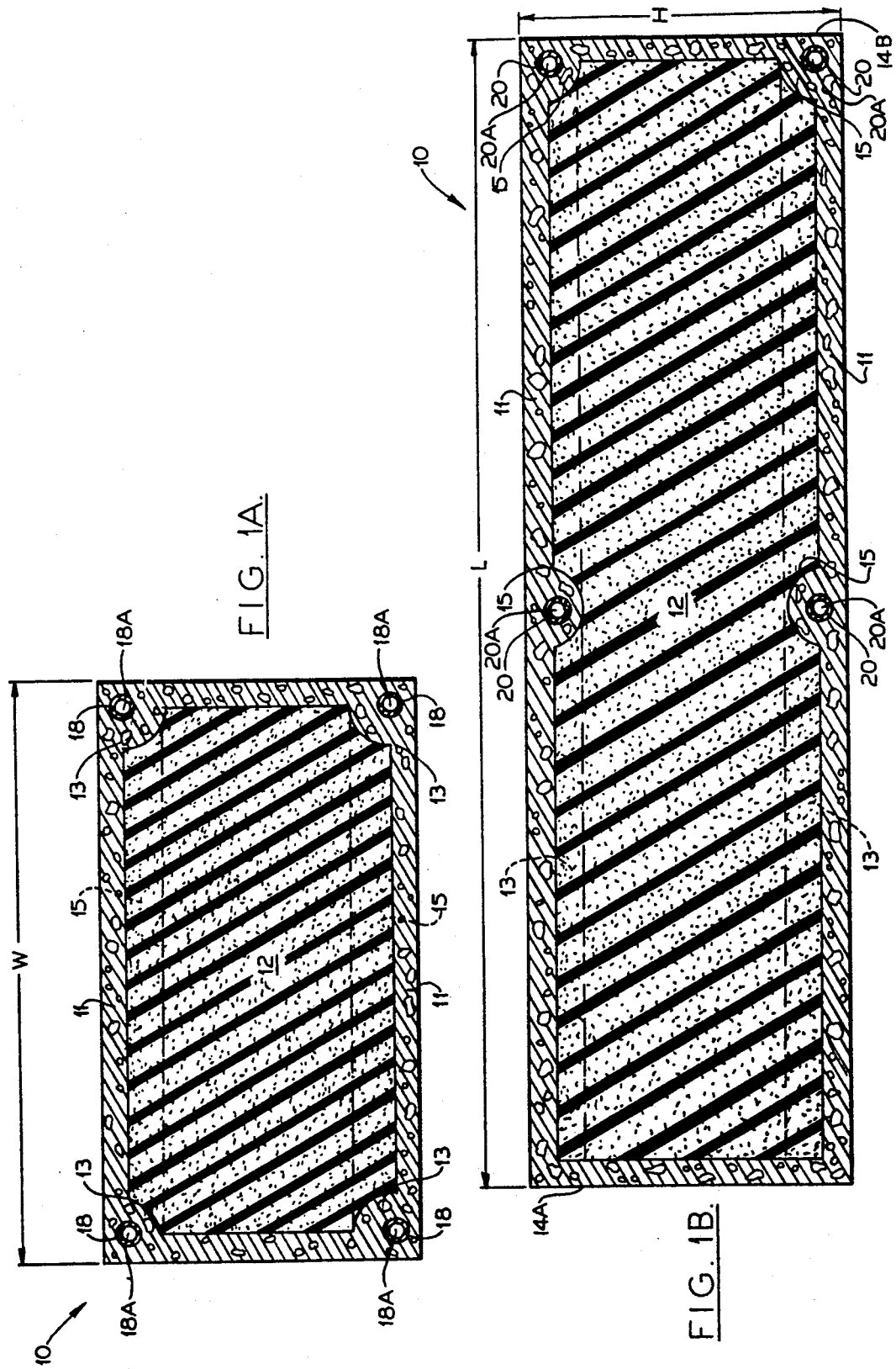

//5,107,785

FLOATING DOCK AND BREAKWATER

FIELD OF THE INVENTION

The invention relates to concrete floating docks, breakwaters and the like, and more particularly to a floating dock or breakwater formed of a series of concrete floatation modules.

BACKGROUND OF THE INVENTION

Concrete floating docks and breakwaters, such as described in U.S. Pat. No. 4,318,361 to Sluys, have been assembled from a series of concrete modules. The modules typically comprise either a hollow concrete shell or a concrete shell surrounding a buoyant foam core. For use as a breakwater or a dock, the assemblage of modules are typically connected at one or both ends to an anchoring point, such as a driven piling or a weighted anchor. As a breakwater, the assemblage of modules is intended to absorb or reflect the incident wave energy and thereby provide a sheltered area of relatively calm water for the mooring of boats.

When used as a dock, the assemblage of modules may be fitted with a suitable decking material or the upper exposed concrete surface may be provided with a slip resistant finish. It may be desirable to have the incident wave energy pass unimpeded through open portions of the dock so that the dock remains relatively stable. Open portions between adjacent modules may also be desirable to allow floating debris to pass therethrough and avoid the unsightly accumulation of the debris.

Interconnecting of the modules for a concrete dock or breakwater has been accomplished in a number of ways. For example, U.S. Pat. No. 4,693,631 to McKay discloses a pair of longitudinal strips running alongside and secured to the upper opposing sides of adjacent modules. In a similar fashion, U.S. Pat. No. 4,709,647 to Rytand discloses opposing inner and outer sidewales, preferably formed of wood, for maintaining adjacent modules in alignment while leaving a one or two foot gap therebetween.

However, interconnection of adjacent floatation modules at the top portion allows the modules to pivot relative to one another. Such pivotal movement places high stress forces on any interconnecting member and may subject such a member to premature failure. In addition, the pivoting motion provides a less effective inertial barrier to the wave action and also creates an unstable surface for dock users. If the bottom portions of adjacent modules collide during the pivoting movement, damage to the modules is likely.

U.S. Pat. No. 4,321,882 to Sluys discloses chains or cables passing through two internal passageways in a series of modules with a pair of resilient spacers positioned between adjacent modules. The modules are thus allowed to move pivotally with respect to one another. The pivotal movement of adjacent modules places considerable stress on the resilient spacers and may result in increased maintenance expense for repairing damaged or worn resilient spacers. The pivoting provides a less effective inertial barrier to the wave action and also may create an unstable surface for dock users. The pivoting action about a center point may damage both the top and bottom of adjacent modules when these portions collide as a result of wave action.

SUMMARY OF THE INVENTION

It is an object of the present invention to provide a floatation module adapted to be used as a floating dock or breakwater which acts as a single monolithic structure and thereby minimizes damaging movement of adjacent modules relative to one another while also providing a high inertial barrier to wave action.

It is another object of the present invention to provide floatation modules which may be readily interconnected to form a floating dock or breakwater.

It is still another object of the present invention to use the compressive strength of concrete and the tensile strength of steel to produce a floating dock or breakwater that is economical to manufacture, assemble and maintain.

It is yet another object of the present invention to provide floatation modules which may be readily laterally interconnected to facilitate the formation of laterally extending branches.

These and other objects of the present invention are provided by a rectangular floatation module formed of a molded rectangular concrete shell having thickened portions in predetermined areas thereof. The thickened portions provide additional compressive strength to the module. The thickened portions are preferably formed in the interior corner portions of the shell and extend lengthwise therein between opposing end faces of the shell. In alternate embodiments, the thickened portions may also define an imaginary quadrilateral polygon on the end faces rather than being positioned at the corners.

The concrete for the shell preferably includes polyolefin fibers which serve to reinforce the concrete. The fibers provide additional strength to the concrete and are not subject to corrosion as are various metal reinforcing materials. In addition, since the fibers are premixed in the concrete, construction labor is saved since reinforcing members do not have to be separately assembled in the concrete mold as with traditional metal reinforcements.

A floatation material, such as a rigid foam, is positioned within the molded concrete shell and gives the module an overall buoyancy sufficient to remain at the surface of the water. The floatation material may preferably be a rigid foam material which also serves as a molding core for the concrete shell. The rigid foam preferably has a rectangular shape corresponding substantially to the interior of the molded concrete shell and has cutaway portions extending between opposing end faces for effecting molding of the lengthwise thickened portions of the concrete shell.

Hollow tubular liners are molded integral with each of the lengthwise extending thickened concrete portions. The liners are preferably formed of a rigid plastic tubing which is inert to the corrosive attack of the marine environment and which presents passageway for an interconnecting means, such as a cable, rope, or chain, which may be passed through the passageways and secured at the ends of a series of modules to maintain the modules in an end-to-end relation thereby forming the single monolithic structure.

The rectangular floatation modules may preferably include a plurality of additional thickened portions extending widthwise in the concrete shell and transverse to the lengthwise extending thickened concrete portions. A hollow tubular liner may be molded integral with each of the widthwise extending thickened portions to present a passageway therethrough. The widthwise extending thickened concrete portions preferably define four corner areas of the same imaginary quadrilateral as the lengthwise extending thickened portions to thereby facilitate the interconnecting of laterally extending rectangular floatation modules. In one embodiment according to the invention, the rectangular floatation module has a length that is twice the width. In this embodiment, two of the widthwise thickened concrete portions are then preferably positioned at the end of the concrete shell and two of the widthwise thickened portions are positioned at the midpoint between opposing ends of said concrete shell.

The rectangular floatation module may also include securing means, integrally molded in a predetermined portion of the concrete shell, for permitting securing of an external attachment to said concrete shell. A threaded fastener positioned in the concrete prior to curing provides a securing means for an attachment, such as an eye or a cleat, to secure a mooring line to.

A structure for use as a floating dock, breakwater and the like, may be formed from a plurality of rectangular floatation modules arranged in an end-to-end series relation. An interconnecting means, such as a steel cable, chain, or rope, is passed through each of the passageways presented by the tubular liners. The interconnecting means is kept at a desired tension to place the modules under compression and prevent unwanted relative movement of adjacent modules relative to one another. Thus, a structure acting as a single monolithic structure may be formed to resist wave action.

A threaded swaged fitting may be applied to one end of the cable to facilitate tensioning of the cable. The series of modules are maintained in compression by the tensioned steel cables. Thus, the compressive strength of concrete and the tensile strength of steel may be combined to produce the single monolithic structure.

The floating dock or breakwater may include at least one module having widthwise extending tubular liners to facilitate interconnecting a laterally extending floatation module. The laterally extending module, or modules, may be interconnected to the main portion of the floating dock or breakwater by an interconnecting means, such as steel cable, as described above for forming the main portion of the structure.

The floatation module according to the present invention may be readily formed on-site and placed into the water. First, the lengthwise extending tubular liners are positioned into a rectangular mold between opposing end faces of the mold substantially in the four interior corner areas of the mold. A bottom layer of concrete may then be poured into the mold. The buoyant foam core is then positioned in the mold atop the bottom concrete layer. The core includes the cutaway corner portions to form a thickened concrete portion around each lengthwise extending tubular liner. The mold is then filled with concrete and allowed to cure thereby forming the concrete shell having the tubular liners and the core molded integral therewith. The floatation module may then be removed from the mold and placed into the water. The modules may be aligned and the interconnecting means, such as a steel cable, may then be inserted and properly tensioned to form the floating dock or breakwater.

The buoyant foam core may include widthwise extending cutaway portions and widthwise extending tubular liners may be inserted into the mold to form a floatation module that may readily accept a laterally extending floatation module.

BRIEF DESCRIPTION OF THE DRAWINGS

FIG. 1A is a transverse cross-sectional view of a floatation module according to the present invention.

FIG. 1B is a longitudinal cross-sectional view of a floatation module according to the present invention.

DETAILED DESCRIPTION OF THE PREFERRED EMBODIMENT

Figure 2A:
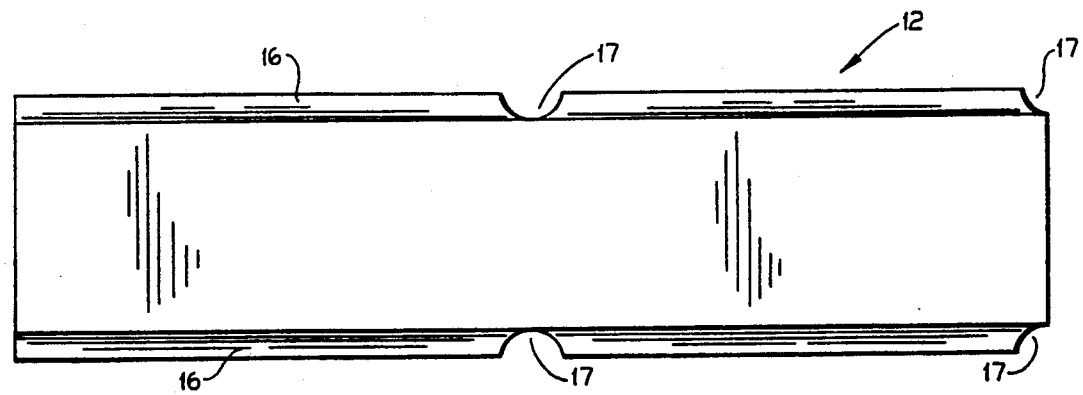
FIG. 2A is a longitudinal side view of a rigid foam molding core according to the present invention.

The present invention will now be described more fully hereinafter with reference to the accompanying drawings, in which a preferred embodiment of the invention is shown. This invention may, however, be embodied in many different forms and should not be construed as limited to the embodiment set forth herein; rather, applicant provides this embodiment so that this disclosure will be thorough and complete, and will fully convey the scope of the invention to those skilled in the art. Like numbers refer to like elements throughout.

Referring to FIGS. 1A and 1B, a floatation module 10 according to the present invention is illustrated. The module 10 is formed of a molded concrete shell 11 surrounding a buoyant foam core 12. The module 10 may preferably be formed having dimensions such that it may readily be formed on-site and moved with standard equipment, such as a backhoe, to its final placement in a body of water. Preferable approximate dimensions for the module 10 are 104"L×52"W×28"H. With these overall dimensions, the concrete shell 11 may preferably be formed having a wall thickness of approximately 2" to provide adequate strength without using an unnecessary quantity of concrete.

The shell 11 includes thickened portions of concrete 13 extending lengthwise between opposing end faces 14A, 14B. The thickened portions 13 provide reinforcing for tubular liners 18 which are integrally molded with the shell 11. The thickened portions 13 preferably extend about 1.5" surrounding the tubular liners 18, the tubular liners 18 being roughly centered in the corner of the shell 11. While the thickened portions 13 are illustrated in the corner portions of the shell 11, it would be understood by those skilled in the art that other arrangements may be used. For example, a pattern of four thickened portions could be positioned along the walls of the shell 11 defining an imaginary quadrilateral.

To facilitate an interconnection of a module 10 in a laterally extending direction, a module 10 may also be formed with widthwise extending thickened portions 15. If the module 10 has a length substantially twice the width, the pattern of lengthwise extending thickened portions 13 corresponds to the pattern of widthwise extending thickened portions 15, that is, the widthwise thickened portions 15 may preferably be positioned at an end and the midpoint of the module 10 as best shown in FIG. 1B.

The concrete shell 11 is preferably formed of a concrete reinforced with collated fibrillated polyolefin fibers. Suitable fibers are available under the trademark Forta CR, manufactured by Forta Corporation, 100 Forta Drive, Grove City Pa., 16127. The fibers are mixed into the concrete prior to pouring preferably at a minimum rate of 1.6 pounds per cubic yard of concrete. The fibers provide reinforcement to the concrete and may be used in place of conventional wire mesh or steel rod reinforcements which may be subject to corrosion in the marine environment. Conventional metal reinforcement methods also require labor to accurately position the reinforcements in the mold prior to pouring of the concrete. The fiber reinforcement obviates the need for this additional labor.

Figure 2B:
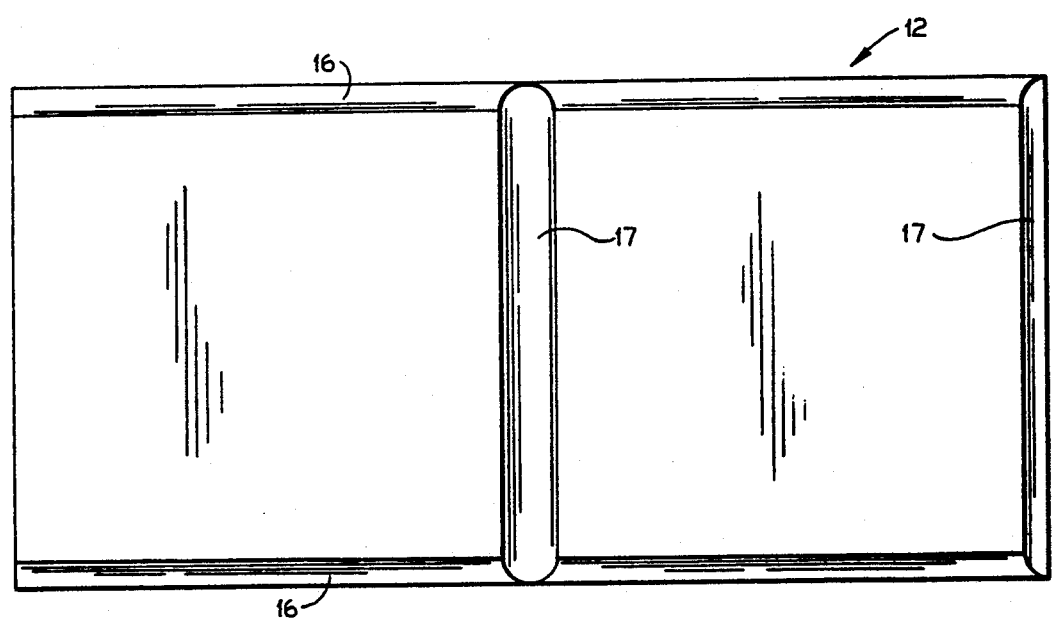
FIG. 2B is a top view of a rigid foam molding core according to the present invention.

The buoyant foam core 12 positioned within the shell 11 may preferably be formed of a rigid foam material. The rigid foam core 12 serves as a molding core in forming the concrete shell 11. FIGS. 2A and 2B show a side and top view, respectively, of a rigid foam core 12 as used to form the lengthwise 13 and widthwise 15 thickened concrete portions of the shell. The core 12 includes lengthwise extending cutaway corner portions 16 to form the corresponding lengthwise thickened concrete portions 13 (FIGS. 1A and 1B). Similarly, the core 12 includes widthwise extending cutaway portions 17 to form the corresponding widthwise extending thickened concrete portions 15.

Figure 3A:
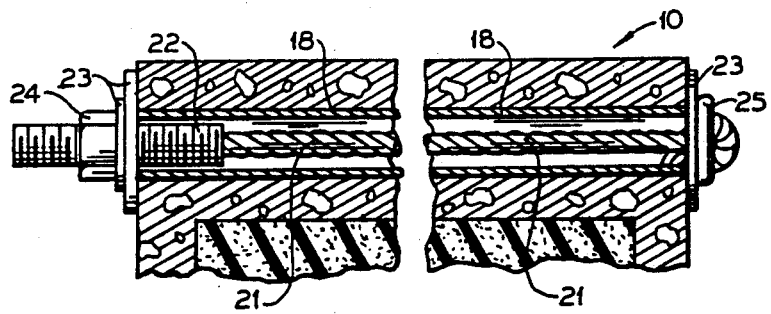
FIG. 3A is a fragmentary longitudinal view of a series of modules illustrating the manner in which the interconnecting cable is positioned for maintaining a series of floatation modules in an end-to-end relation according to the present invention.

The concrete shell 11 includes lengthwise extending tubular liners 18 integrally molded with the shell 11 in the lengthwise extending thickened portions 13 thereof. Widthwise extending tubular liners 20 may also be integrally molded in the widthwise extending portions 15 of the shell 11. The tubular liners 18, 20 provide passageways 18A, 20A through the shell for passage therethrough of an interconnecting means—preferably a steel cable 21, as shown in FIG. 3A. The tubular liners 18, 19 may preferably be a 1.25" thin-wall plastic tubing, such as made from polyvinyl chloride, commonly used in plumbing. As would be readily understood by one skilled in the art, other plastic or non-corroding materials may be used. The liners 18, 19 mold the passageways 18A, 20A in the modules 10 and also provide a smooth lining for passage therethrough of a steel cable 21 (FIG. 3A) or other interconnecting means.

Figure 3B:
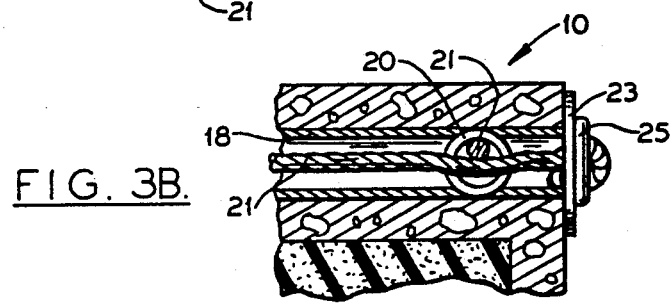
FIG. 3B is a fragmentary view of a corner detail of a floatation module according to the present invention illustrating the manner in which transverse interconnecting cables are positioned relative to each other.

When widthwise tubular liners 20 are desired in a module, these liners 20 will intersect the lengthwise extending liners 18. The tubular liners 18, 20 may be notched and glued at points of intersection during preparation for the molding process. Referring to FIG. 3B, the tubular liners 18, 20 and the steel cables 21 passing therethrough are sized so that two cables 21 may cross at a point of intersection. Preferably the tubular liners 18, 20 have an inner diameter of approximately 1.25" and the steel cable 21 is approximately ½". Sufficient clearance is therefore provided to allow the cables 21 to cross adjacent to one another. As would be readily understood by those having skill in the art, the tubular liners 18, 20 may be sufficiently offset so that they do not intersect and, if so, the liners 18, 20 may have a smaller diameter and still accommodate the ½" steel cable 21 passing therethrough.

Figure 4:
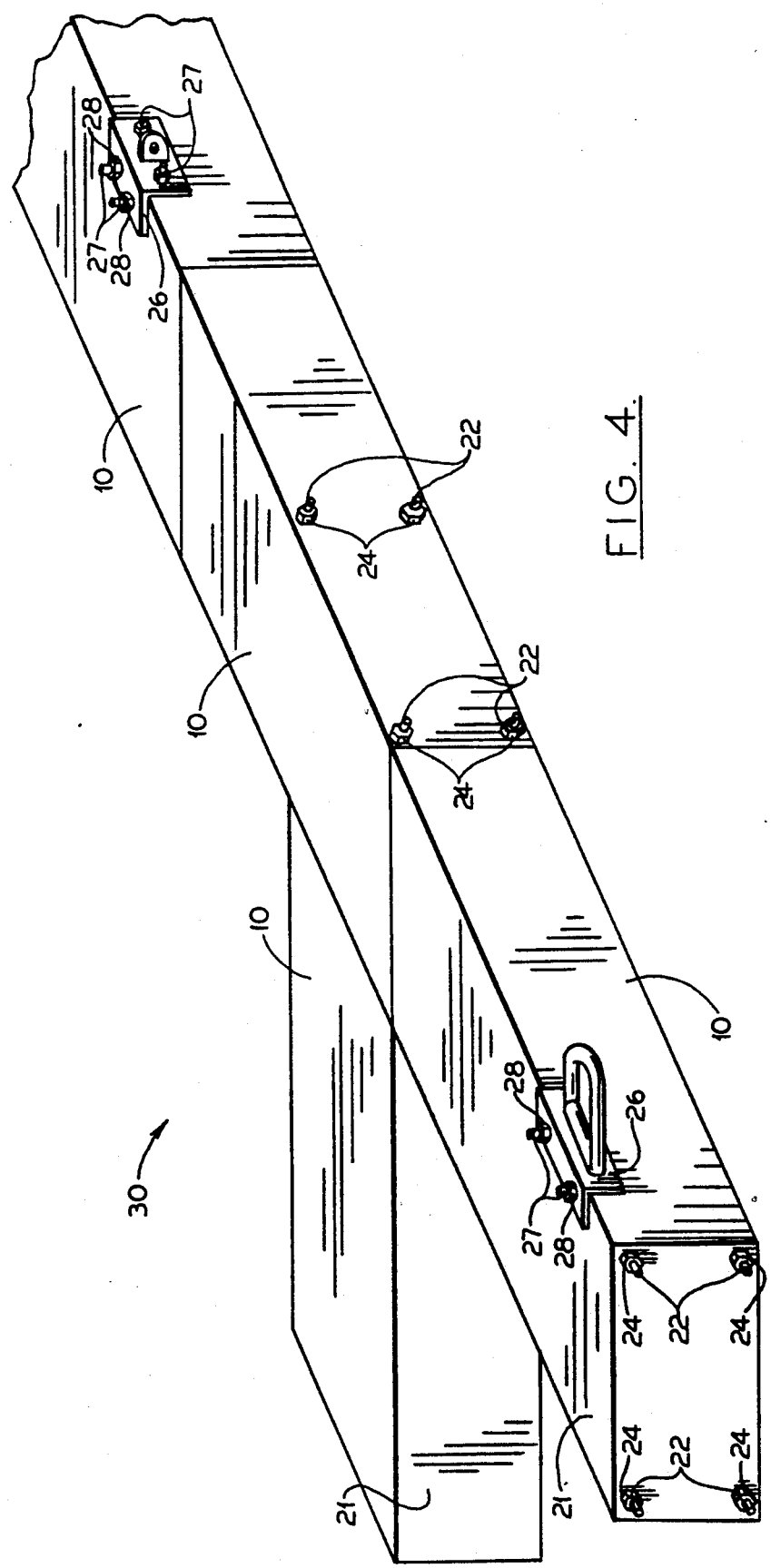
FIG. 4 is a perspective view of an assemblage of floatation modules according to the present invention including a series of end-to-end modules and a laterally positioned module connected thereto.

As assemblage 30 of floatation modules 10 is illustrated in FIG. 4. The modules 10 are aligned in an end-to-end series of at least two modules 10. An interconnecting means, such as a steel cable 21 (FIG. 3A), is positioned through the passageways 18A, 20A in the tubular liners 18, 20 (FIGS. 1A and 1B). Other interconnecting means may also be used, such as a chain or rope, as would be readily understood by those having skill in the art. The steel cable 21 may include a fixed end fixture 25 (FIG. 3A) and an adjustable end fixture comprising a threaded swaged end 22. The swaged end 22 may be secured by a nut 24 threaded thereon. Washers 23 are preferably positioned adjacent the outer concrete surface to evenly distribute the applied compressive forces. A large tension, up to several thousand pounds, may be placed on the steel cable 21 to hold the modules 10 in compression. The assemblage 30 of modules 10 maintained in compression by the tension of the steel cables 21 thus acts as a single monolithic structure.

An attachment 26 may be affixed to a floatation module 10 by integrally forming a securing means, such as a threaded fastener 27, in an outer portion of the concrete shell. The attachment 26 may then be fitted over the threaded fastener 27 and secured with a nut 28. The attachment 26 may be used to secure the assemblage of modules 30 to a driven piling or to a submerged anchor. The attachment 26 may also be used to secure lines from boats.

Figure 5A:
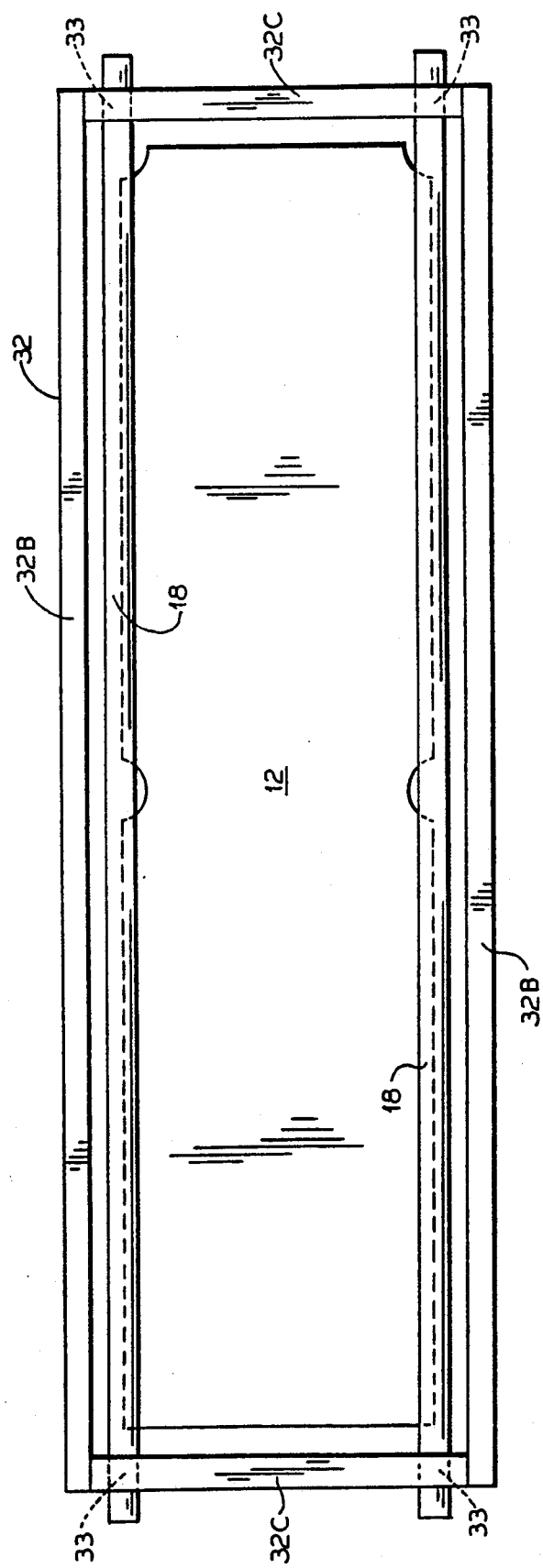
FIG. 5A is a schematic plan view of a concrete mold during the initial steps in the method of forming a floatation module according to the present invention.
Figure 5B:
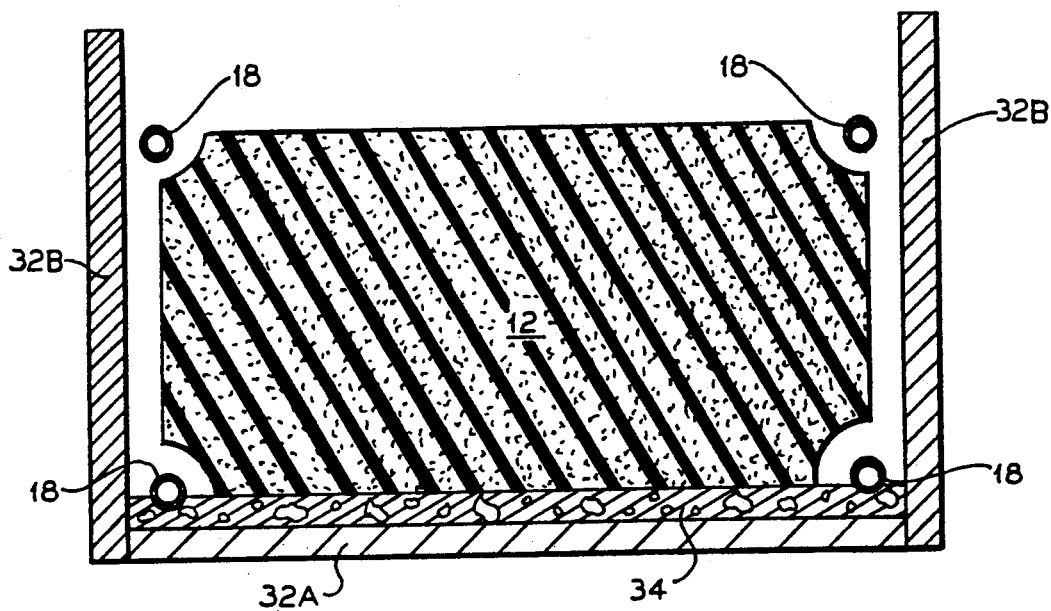
FIG. 5B is a schematic transverse cross-sectional view of a floatation module in the method of the present invention prior to additional concrete being poured into the mold.
Figure 5C:
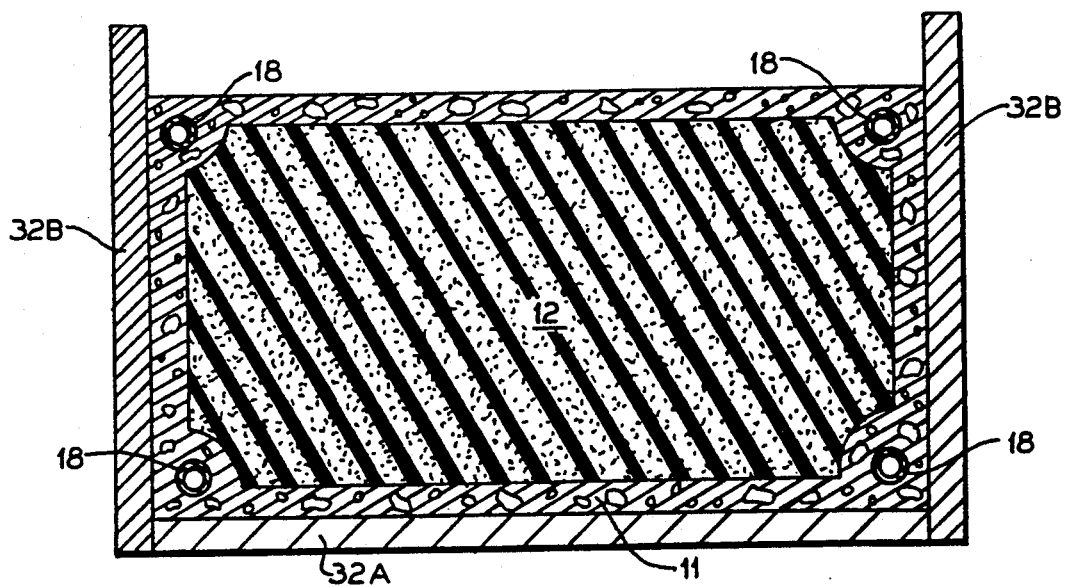
FIG. 5C is a schematic transverse cross-sectional view of a floatation module in the method of the present invention.

Referring to FIGS. 5A–5C, the floatation module 10 may readily be formed on-site and then transported to a nearby body of water according to the method of the present invention. A rectangular mold 32 is provided with a bottom 32A, and removable sides 32B, 32C. The lengthwise extending tubular liners 18 (FIG. 1B) are positioned in the mold 32 and extend through openings 33 in the sides 32C of the mold 32. A first layer of concrete 34 may then be poured into the mold 32 to a desired level to support the buoyant foam core 12. The core 12 may then be positioned atop the first layer of concrete 34 and the remaining concrete poured into the mold 32 to completely cover the buoyant core 12 (FIG. 5C). If desired, threaded fasteners 27 (FIG. 4) may be positioned in the concrete before curing to allow an attachment 26 to be secured to the module 10.

After the concrete has cured, the lengths of tubular liners 18 extending beyond the sides of the mold 32 may be trimmed flush and the sides 32B, 32C of the mold 32 removed. The floatation module 10 may then be removed and placed into the water. To simply this transportation step, a cable may be placed through one of the tubular liners 18 and the cable ends may then be connected to a backhoe, crane or other lifting device.

If widthwise extending tubular liners 20 are desired, a first assembly of lengthwise and widthwise liners 18, 20 may be positioned in the bottom area of a mold. A first layer of concrete may then be poured and the molding core 12 positioned atop the first layer of concrete. The upper assembly of widthwise and lengthwise extending liners 18, 20 may then be positioned in the mold. Concrete may then be poured to fully surround the buoyant core 12 and tubular liners 18, 20.

Many modifications and other embodiments of the invention will come to one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

That which is claimed is:

1. A rectangular floatation module adapted to be used as a floating breakwater or dock, said module comprising;
    a molded rectangular concrete shell;
    a substantially rectangular block of floatation material positioned within said molded concrete shell;
    pairs of lengthwise extending upper and lower tubular liners extending along respective upper and lower corner portions of said rectangular block of floatation material and integrally molded with said concrete shell;
    widthwise extending tubular liners extending along respective upper and lower portions of said block of floatation material and integrally molded with said concrete shell;
    said lengthwise and widthwise extending tubular liners in said upper portions intersecting with each other and being in a common plane with each other; and
    said lengthwise and widthwise extending tubular liners in said lower portions intersecting with each other and also being in a common plane with each other.

2. A rectangular floatation module according to claim 1 wherein said molded concrete shell has thickened corner portions extending lengthwise therein between opposing end faces of said concrete shell.

3. The rectangular floatation module of claim 1 wherein said concrete shell comprises polyolefin fibers reinforcing said molded concrete shell.

4. The rectangular floatation module of claim 1 further comprising securing means, integrally molded in a predetermined portion of said concrete shell and having portions extending outwardly therefrom, for permitting securing of an attachment to said concrete shell.

5. The rectangular floatation module of claim 4 wherein said securing means comprises a threaded fastener.

6. The rectangular floatation module of claim 1 wherein said lengthwise and widthwise tubular liners comprise a rigid plastic material for facilitating the molding of said lengthwise and widthwise passageways and for avoiding corrosion in a marine environment.

7. A structure adapted to be used as a floating breakwater or dock, said structure comprising:
    a plurality of rectangular floatation modules arranged in an end-to-end series relation, each of said modules comprising:
    a molded rectangular concrete shell;
    a substantially rectangular block of floatation material positioned within said molded concrete shell;
    pairs of lengthwise extending upper and lower tubular liners extending along respective upper and lower corner portions of said rectangular block of floatation material and integrally molded with said concrete shell;
    widthwise extending tubular liners extending along respective upper and lower portions of said block of floatation material and integrally molded with said concrete shell;
    said lengthwise and widthwise extending tubular liners in said upper portions intersecting with each other and being in a common plane with each other; and
    said lengthwise and widthwise extending tubular liners in said lower portions intersecting with each other and also being in a common plane with each other; and
    means extending through said passageways presented by each of said lengthwise extending tubular liners for interconnecting and maintaining said rectangular floatation modules in said end-to-end series relation.

8. The structure of claim 7 wherein said interconnecting means comprises a steel cable, and means for tensioning said cable so as to maintain said modules under compression in assembled end-to-end series relation.

9. The structure of claim 8 wherein said tensioning means comprises a swaged threaded fitting secured to a first end of said cable, and a fixed fitting secured to a second end of said cable.

10. The structure of claim 7 further comprising:
    a lateral extending floatation module of the same construction as said modules in end-to-end series, said laterally extending module being positioned adjacent one of said modules in said end-to-end series so that the tubular liners extending lengthwise in said laterally extending module align with said tubular liners extending widthwise in said one module; and
    lateral interconnecting means extending through said tubular liners of said laterally extending floatation module for interconnecting same to said one module of said end-to-end series of floatation modules.

11. The structure of claim 10 wherein said lateral interconnecting means comprises a steel cable, and means for tensioning said cable to maintain said modules under compression.

12. The structure of claim 11 wherein said tensioning means comprises a swaged threaded fitting secured to a first end of said cable, and a fixed fitting secured to a second end of said cable.

* * * * *